(12) United States Patent
Simpson

(10) Patent No.: US 8,070,059 B2
(45) Date of Patent: Dec. 6, 2011

(54) AUTHORIZATION FOR DEVICE INTERACTION WITH A REMOTE SERVICE

(75) Inventor: Shell S. Simpson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 914 days.

(21) Appl. No.: 11/348,759

(22) Filed: Feb. 7, 2006

(65) Prior Publication Data

US 2007/0185992 A1 Aug. 9, 2007

(51) Int. Cl.
*G06K 5/00* (2006.01)
(52) U.S. Cl. ........................ 235/382; 709/225
(58) Field of Classification Search .................. 235/382; 709/225
See application file for complete search history.

(56) References Cited

U.S. PATENT DOCUMENTS

| | | | | |
|---|---|---|---|---|
| 5,799,151 A | * | 8/1998 | Hoffer | 709/204 |
| 5,960,411 A | * | 9/1999 | Hartman et al. | 705/26 |
| 6,094,276 A | * | 7/2000 | Yamaguchi et al. | 358/1.15 |
| 6,604,085 B1 | * | 8/2003 | Kolls | 705/14.23 |
| 2002/0004733 A1 | * | 1/2002 | Addante | 705/7 |
| 2002/0143642 A1 | * | 10/2002 | Harper | 705/26 |
| 2004/0073666 A1 | * | 4/2004 | Foster et al. | 709/225 |

* cited by examiner

*Primary Examiner* — Daniel Hess
*Assistant Examiner* — Rafferty Kelly

(57) ABSTRACT

A method for authorizing device interaction includes requesting, from a connected device, authorization data from a remote service. At the connected device, authorization data is received and then passed with an authorization prompt to a user interface device. From the connected device, a user interface device response to the prompt is passed to the remote service. At the connected device, authorization setting data is received and stored. The authorization setting data has a value determined according to the user interface device response and is useable by the connected device to determine authorization for subsequent connected device interaction with the remote service.

32 Claims, 7 Drawing Sheets

AUTHORIZATION FOR DEVICE INTERACTION WITH A REMOTE SERVICE

BACKGROUND

Consumer electronic devices are designed to offer functions that rely on network communications between the device and a remote service. For example, a consumer's printer may have a feature in which it is capable of automatically ordering more toner as its toner level reaches a specified level. To do so, the device sends an electronic message to a remote service responsible for causing toner to be delivered to the consumer.

Allowing a device to automatically send information to a remote service hosted on the public Internet raises privacy concerns. In light of those concerns, an authorized user of the device may be asked to opt in and enable the device's communication features. In this manner the user is or should be aware that the device is communicating with the remote service. The user can also be made aware of the nature of that communication and the type if information being exchanged.

Current solutions for obtaining such authorization include embedding a privacy disclosure in the consumer electronic device. The consumer then accesses the device, reads the disclosure, and then decides whether or not to enable the device's communication features. This solution is limiting because the content of the privacy disclosure is determined before the device is shipped from the manufacturer and cannot be changed. This approach has significant pitfalls. For example, laws regarding privacy disclosure are evolving both in the United States and abroad and the information that a device sends to a remote service on the public Internet may change from time to time.

DRAWINGS

DETAILED DESCRIPTION

Various embodiments described below operate to provide up to date information to a device user that allows the user to make an informed decision with respect to enabling communication between a device and a remote service hosted on the public Internet. The following description is broken into sections. The first section, labeled "introduction" describes an exemplary computing environment in which embodiments may be implemented and describes an exemplary implementation using that computing environment. The second section, labeled "components," describes exemplary logical and physical components used to implement various embodiments. The third section, labeled "operation," describes exemplary method steps for implementing various embodiments.

INTRODUCTION

Although the various embodiments of the invention disclosed herein will be described with reference to the network 10 shown in FIG. 1, the invention is not limited to network 10. Embodiments may be implemented in any environment in which information concerning authorizing communication between the device and a remote service hosted on the public Internet is presented to a user.

Figure 1:
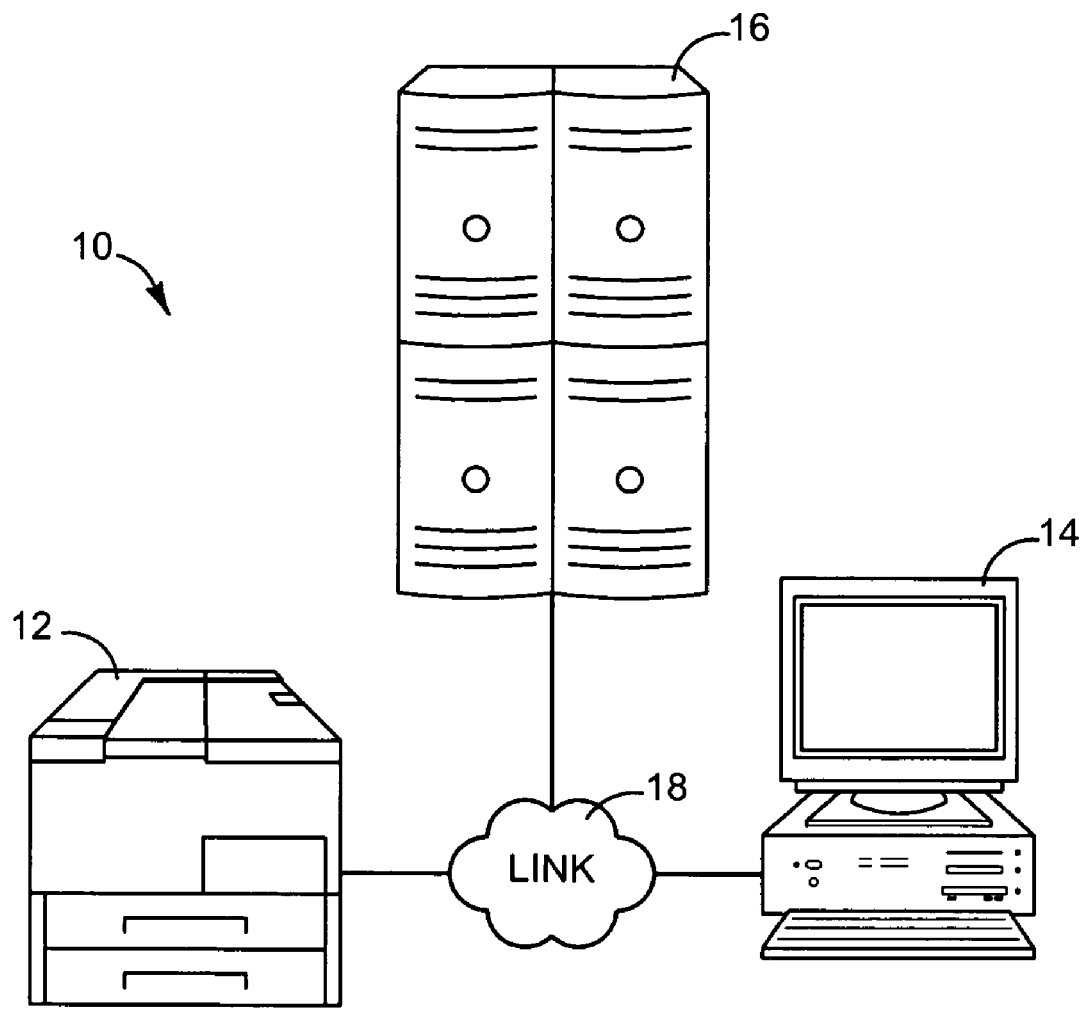
FIG. 1 is a schematic view of a network in which various exemplary embodiments may be implemented.

Referring to FIG. 1, network 10 is shown to include connected device 12, user interface device 14, remote service 16, and link 18. While illustrated as a multi-function printer, connected device 12 represents generally any electronic device capable of network communication with user interface device 14 and remote service 16. The term "connected" is used simply to indicate that connected device 12 is capable of network communication. User interface device 14 represents generally any computing device capable of communicating with connected device 12 and remote service 16. For example, user interface device 14 may be a personal computer, a PDA (personal digital assistant), or even a smart phone.

Remote service 16 represents generally one or more computing devices capable of interacting with connected device 12 to help realize one or more network functions of connected device 12. For example, connected device 12 may be a laser printer capable of communicating with remote service 16 to request toner or another consumable once the consumable level reaches a predetermined level. Remote service 16 is responsible for receiving the electronic order from connected device 12 so that toner may be shipped to the user. Alternatively, remote service 16 may be responsible for actively monitoring the consumable level and taking appropriate action when the consumable level falls below a particular point.

Link 18 represents generally one or more cable, wireless, or remote connections via telecommunication links, infrared links, radio frequency links, or any other connectors or systems of connectors that provides electronic communication between connected device 12, user interface device 14, and remote service 16. Link 18 may include an intranet, the Internet, or a combination of both.

In an exemplary implementation, a user of user interface device 14 accesses remote service 16 via link 18. In response, remote service 16 returns prompting information (e.g., a web page) that allows the user to identify and supply a network address or the like for connected device 12 to remote service 16. Using the received network address for connected device 12, remote service 16 generates and supplies a redirection instruction to user interface device 14. The redirection instruction includes a network address for remote service 16, which is then provided to connected device 12 for use in accessing remote service 16.

The redirection instruction causes user interface device 14 to automatically browse to connected device 12 providing the address for remote service. Given that connected device 12 has not been authorized to access remote service, it returns a web page to user interface device 14 asking permission to access remote service 16.

Once permission is granted, connected device 12 accesses remote service using the supplied address and requests authorization data. Remote service 16 returns authorization data to the connected device. The authorization data includes an authorization prompt. Authorization data is any information that can be provided to and displayed by user interface device 14. As an example, authorization data may be presented in the form of a web page or a series of web pages that contain the text of one or more agreements such as a privacy agreement and a license agreement. An authorization prompt is one or more user accessible controls for indicating acceptance or denial with respect to the authorization data. Those controls may include, for example, radio buttons, check boxes, and command buttons.

Connected device 12 passes the authorization data to user interface device 14. Connected device 12 receives a user interface device response to the prompts and passes that user interface device response back to remote service 16. Remote service 16 returns authorization setting data having a value determined according to the response. Connected device 12 locally stores the authorization setting data for subsequent use.

Authorization setting data represents any information that can be used to determine if connected device 12 has been authorized to interact with remote service 16. As an example, authorization setting data may be a flag having a value of zero or one—one indicating authorization has been granted and zero indicating no authorization has been granted. Alternatively, authorization setting data may have one or more of any number of possible values where each value indicates a different level of authorization and/or different time periods for which authorization is effective. For example, each level of authorization may reflect the type of data that can be exchanged with remote service 16 and a limited time period for which such data can be exchanged. In this manner, the authorization setting data can be used by connected device 12 to limit the level of authorized interaction between connected device 12 and remote service 16. Authorization setting data may also include a name/password (or similar credentials) assigned to connected device 12 for the purpose of authenticating connected device 12 with remote service 16 in subsequent communications. This helps ensure that any given device communicating with the name/password credentials is a device that the user previously authorized.

Components:

The logical components of various embodiments will now be described with reference to the exemplary block diagram of FIG. 2. In this example, connected device 12 is shown to include functional components 20, device communication logic 22, device authorization logic 25, device authorization settings 26, and device interaction logic 28.

Functional components 20 represent generally any combination of programming and/or hardware capable of implementing one or more functional aspects of connected device 12. For example, when connected device 12 is a printer, function components 20 are responsible for printing.

Device communication logic 22 represents generally any combination of programming and/or hardware capable of receiving an access request from and interacting with user interface device 14. For example, device communication logic 22 may be a web server embedded in connected device 12 that is capable of serving web pages to user interface device 14. An access request, for example, may be a simple HTTP "get" command issued when an URL is typed into a web browser. Device communication logic 22 is also capable of programmatic interaction with remote service 16. For example, device communication logic 22 may include programming for sending and receiving messages in one or more formats over HTTP (Hypertext Transport Protocol). Examples of formats include HTML (Hypertext Markup Language), XML (Extensible Markup Language) and SOAP (Simple Object Access Protocol).

While shown as a single component operating on a connected device 12, device communication logic may be multiple interacting components operating on one or more additional devices (not shown). For example, device communication logic 22 may include a web server component embedded in connected device 12 and a client component in the form of a peripheral connected to an external port supplied by connected device 12. The web server component would be responsible for communication with user interface device 14 while the client component would be responsible for communications with remote service 16.

Device authorization logic 25 represents generally any combination of programming and/or hardware capable of, under the instruction of user interface device 14, utilizing device communication logic 22 to authorize interaction between connected device 12 and remote service 16. As will be discussed below in more detail, device authorization logic 25 (with the aid of device communication logic 22) is responsible for intermediating or otherwise supporting communication between user interface device 14 and remote service 16.

An objective of that communication is to provide user interface device with authorization data that includes an authorization prompt and to return a user's response to the prompt to remote service 16.

In performing its tasks, device authorization logic 25 receives authorization setting data from remote service 16 and stores that data in device authorization settings 26. Device authorization settings 26 represents generally any memory such as NVRAM (Non Volatile Random Access Memory) capable of being utilized to store the authorization setting data for subsequent use. As discussed above, authorization setting data represents any information that can be used to determine if connected device 12 has been authorized to interact with remote service 16.

Device interaction logic 28 represents generally any combination of programming and/or hardware capable of utilizing device communication logic 22 to interact with remote service 16. Device interaction logic 28 is responsible accessing device authorization settings 26 to utilize authorization setting data to limit such interaction. For example, device interaction logic 28 may limit the type of data it provides remote service 16 based on a value of the authorization setting data.

Remote service 16 is shown to include remote communication logic 30, remote authorization logic 32, authorization data store 34, session data store 36, and remote interaction logic 38. Remote communication logic 30 represents generally any combination of programming and/or hardware capable of receiving an access request from and interacting with user interface device 14. Remote communication logic 30 is also responsible for interacting with connected device 12. For example, remote communication logic 30 may be a web server capable of serving web pages to user interface device 14 and returning requested data to connected device 12.

Remote authorization logic 32 represents generally any combination of programming and/or hardware capable of utilizing remote communication logic 30 to obtain data from user interface device 14, to redirect user interface device 14 to connected device 12, to provide authorization data and authorization setting data to connected device 12.

In one exemplary implementation, remote authorization logic 32 provides remote communication logic 30 with a web page or other interface to serve to user interface device 14. That web page includes controls for entering data identifying connected device 12. That identifying data, referred to below as connected device access data, may include a network address for the connected device 12 or the address of a proxy server and a port for accessing connected device 12. That web page may also include controls for identifying a user or user account in case where the services provided by remote service are subscription based or rely on some form of billing.

Remote authorization logic 30 then uses data entered through that web page to redirect user interface device 14 to connected device 12. In doing so, remote authorization logic 30 assembles a redirection instruction from the connected device access data. That redirection instruction may include the connected device access data for accessing connected device 12 and remote service access data for connected device 12 to use to access remote service 16.

The redirection instruction may also include session data. The session data is information that identifies a relationship between user interface device 14 and remote service 16. The session data may be a key having a unique value. When remote authorization logic 32 later receives the session data from connected device, it can distinguish connected device 12 from other connected devices (not shown). In other words, when remote service 16 receives a request from connected device and that request includes the session data, remote authorization logic 32 can analyze the session data to determine that request from connected device 12 is being made at the request of or with the apparent knowledge of user interface device 14.

The following is an example of the contents of an HTML file for a web page containing a redirection instruction:

```
<HTML>
<HEAD>
    <META HTTP-EQUIV="Refresh" CONTENT="URL=
    [address1] data1 =[key] data2? = [address 2]">
</HEAD>
</BODY>
</HTML>
```

In this example, [address 1] represents connected device access data—that is—data such as a network address for accessing connected device 12. [Key] represents the session data. [Address 2] represents remote service access data, that is, data such as a network address for connected device 12 to use to access remote service 16. When processed by user interface device 14, the HTML file instructs user interface device 14 to send an access request to connected device 12 using the connected device access data. The access request includes the session data and the remote service access data for accessing remote service 16.

After some interaction with user interface device 14 (an example of which will be described below), connected device 12 uses the remote service access data to access remote service 16 and request authorization data. In doing so, connected device 12 provides remote service 16 with the session data. In response to the request, remote authorization logic 32 uses the session data to determine that the request was made on behalf of or with the apparent knowledge of user interface device 14. Remote service 16 causes remote communication logic 30 to return authorization data to connected device 12. If able to identify user interface device 14, remote service 16 may, for example, select the authentication data according to the session data, in other words, remote service 16 may customize the authentication data to be returned based at least partly on the session data.

In any event, the authorization data includes an authorization prompt as discussed above. The authorization data may also include a human key prompt. A human key prompt typically includes a graphical image of an alpha numeric data string and a text box allowing a user to respond by manually entering that human key data string. The human key prompt helps deter malicious automated attacks.

As noted above, connected device 12 passes the authorization data to user interface device 14. Connected device 12 receives and passes the user interface device responses to the authorization prompt and human key prompt back to remote service 16. Remote authorization logic 32, after verifying the user interface device response to the authorization prompt and human key prompt, causes remote communication logic 30 to return authorization setting data having a value determined according to the user interface device response to the authorization prompt. For example, the authorization prompt may ask a user to accept or decline a privacy policy and/or a license agreement. If the user interface device response indicates a user's acceptance, then the authorization setting data will have a value indicating authorization for connected device 12 to interact with remote service 16. Otherwise, the authorization setting data will have a value indicating that no such authorization exists. Such non-authorization may be indicated by the absence of authorization setting data.

Continuing with the components of remote service 16, authorization data store 34 represents memory containing the authorization data or information from which the authorization data can be assembled. Session data store 36 represents a database of session data used to identify relationships between remote service 16 and various user interface devices including user interface device 14.

Remote interaction logic 38 represents generally any combination of programming and/or hardware capable of utilizing remote communication logic 30 to interact with connected device 12 to provide one or functions. Where, for example, connected device 12 is a laser printer, remote interaction logic 38 may receive data indicative of a low toner level and ultimately cause replacement toner to be delivered to a physical address associated with connected device 12.

User interface device 14 is shown to include user interface logic 40. User interface logic 40 represents generally any combination of programming and/or hardware capable of interacting with remote service 16 and connected device 12. For example, user interface logic 40 may be a commercially available web browser capable of causing user interface device 14 to request and display web pages and to pass information entered through those web pages back to remote service 16 and connected device 12.

Operation:

The operation of embodiments will now be described with reference to the flow diagrams of FIGS. 3-5 and the exemplary screen displays of FIGS. 6-8 and 9A-9C. FIG. 3 is a flow diagram of exemplary acts taken from the perspective of a connected device such as connected device 12 of FIG. 2. Initially, a user interface device has been redirected to the connected device and has provided with remote service access data—in this case—an address for use by the connected device to contact a remote service such as remote service 16 of FIG. 2. The user interface device may have even provided session data for use in identifying a relationship between the user interface device and the remote service. The connected device has knowledge that it has not been authorized to contact or interact with the remote service, so the connected device prompts the user interface device for permission to contact the remote service (step 42).

Assuming permission is granted, the connected device uses the remote service access data to request authorization data from the remote service (step 44). If available, the request also includes the session data. The connected device receives and passes the authorization data back to the user interface device (step 46). The authorization data includes an authorization prompt allowing for an indication of acceptance or denial of the authorization data. The authorization data may also include a human key prompt.

The connected device receives and passes a client's response to the authorization prompt and the human key prompt to the remote service (step 48). The connected device then receives and stores authorization setting data (step 50). The value of the authorization setting data will indicate whether or not the connected device is authorized to interact with the remote service. The value may also indicate a particular level of authorization as well as identify the connected device in subsequent communication.

Figure 2:
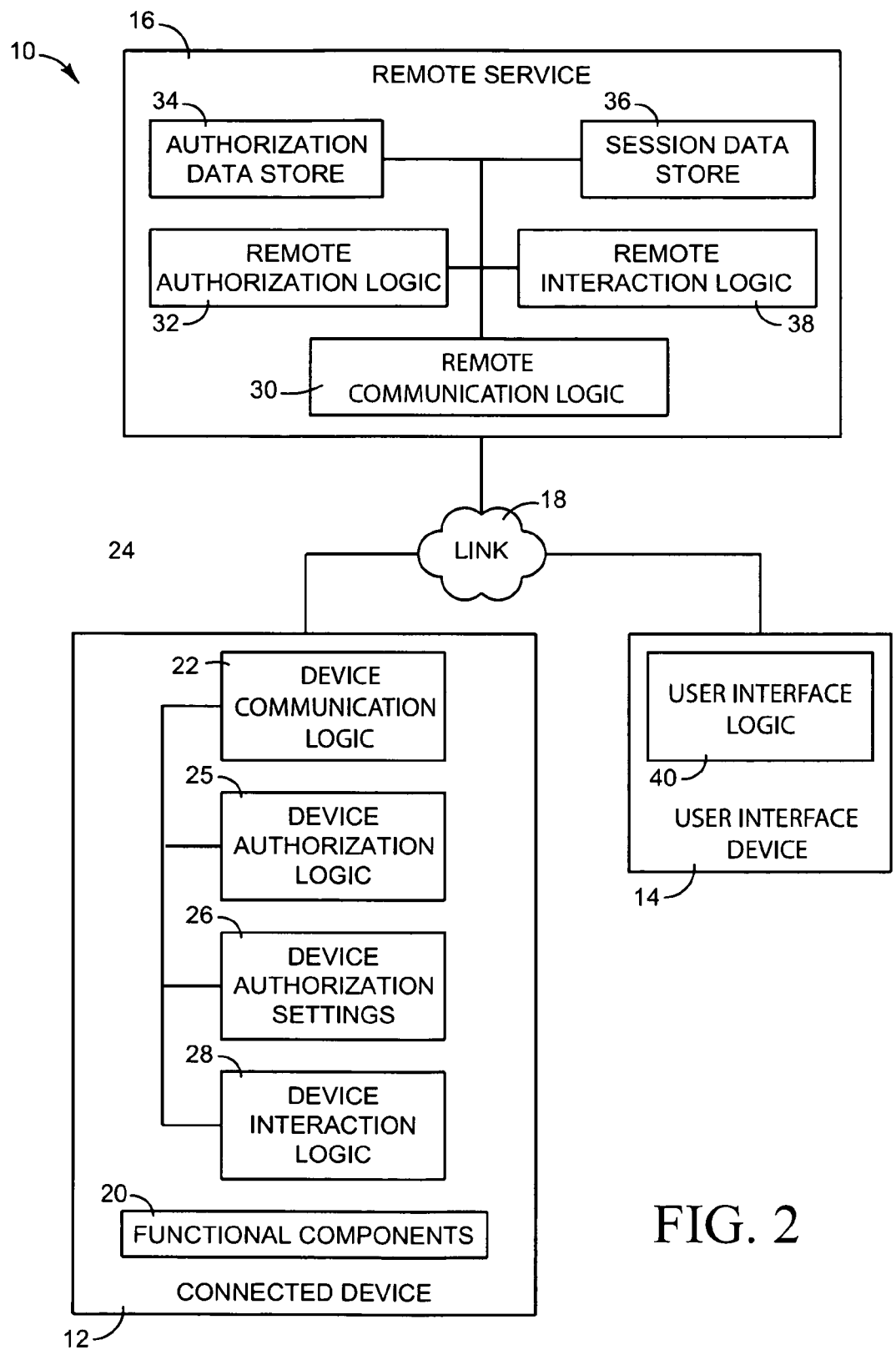
FIG. 2 is a block diagram illustrating logical and physical components operating within a device, within a user interface device, and at a remote service according to an exemplary embodiment.
Figure 3:
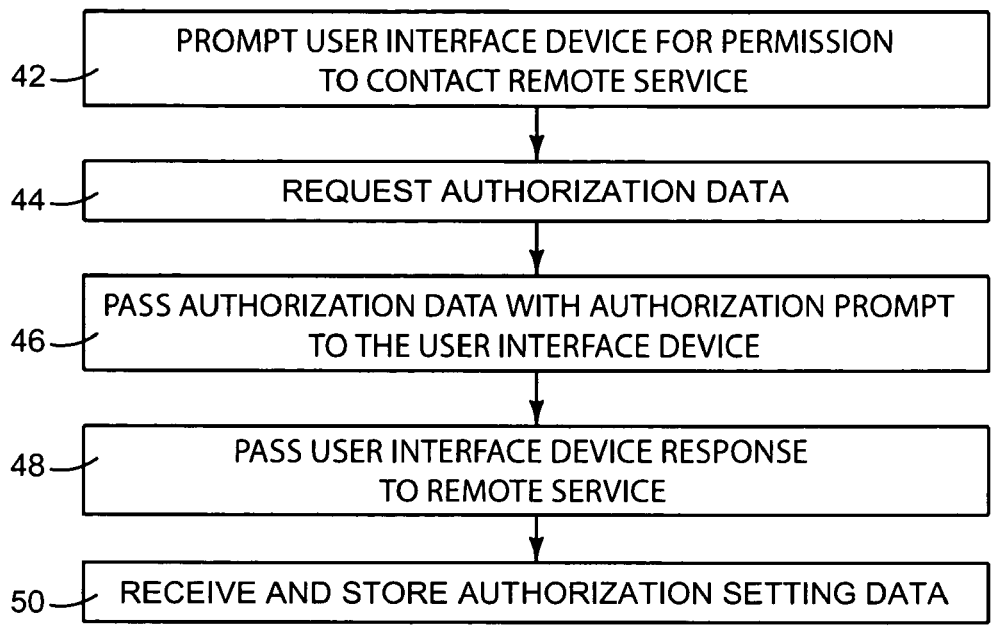
FIGS. 3-5 are exemplary flow diagrams illustrating steps for implementing various exemplary embodiments.
Figure 4:
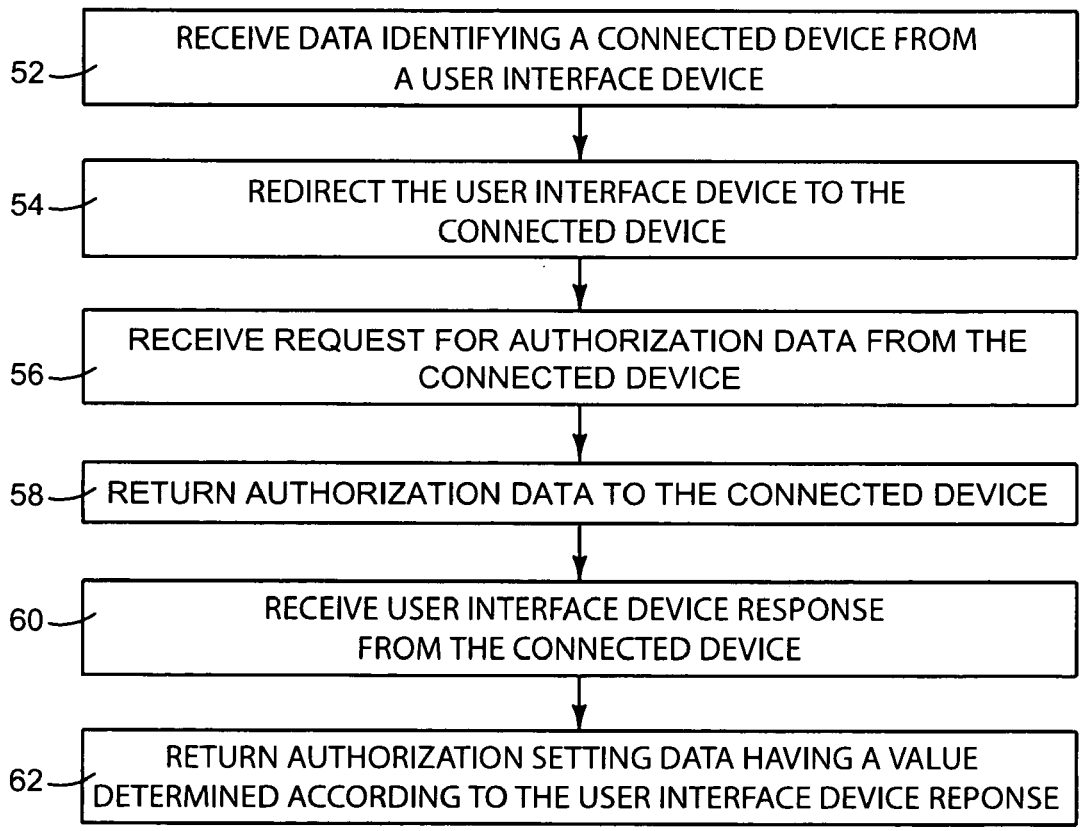

FIG. 4 is a flow diagram of exemplary acts taken from the perspective of a remote service such as remote service 16 of FIG. 2. In response to a request from a user interface device such as user interface device 14 of FIG. 2, the remote service returns a web page or other interface to the user interface device. That interface includes controls enabling a user of the user interface device to supply connected device access data. That interface may also include controls enabling the user to supply user information such as a username and password.

From the user interface device, the remote service receives connected device access data identifying the connected device (step 52). The remote service redirects the user interface device to the connected device (step 54). Step 54, for example may involve sending the user interface device a redirection instruction that includes the connected device access data, remote service access data for the connected device to use to access the remote service, and session data.

It is presumed that redirecting the user interface device in step 54 ultimately results in the connected device requesting authorization data from the remote service. The remote service receives that request in step 56. The remote service returns the authorization data to the connected device (step 58). That authorization data includes an authorization prompt and may include a human key prompt.

The remote service receives a user interface device response from the connected device (step 60). That user interface device response includes a response to the authorization prompt and the human key prompt (assuming the human key prompt was included in the authorization data). The remote service examines the user interface device response to validate the response to the human key prompt and to determine if authorization has been granted for the connected device to interact with the remote service. Assuming the response to the human key prompt is valid, the remote service returns authorization setting data to the connected device (step 62). The authorization setting data has a value determined according to the user interface device response to the authorization prompt.

Figure 5:
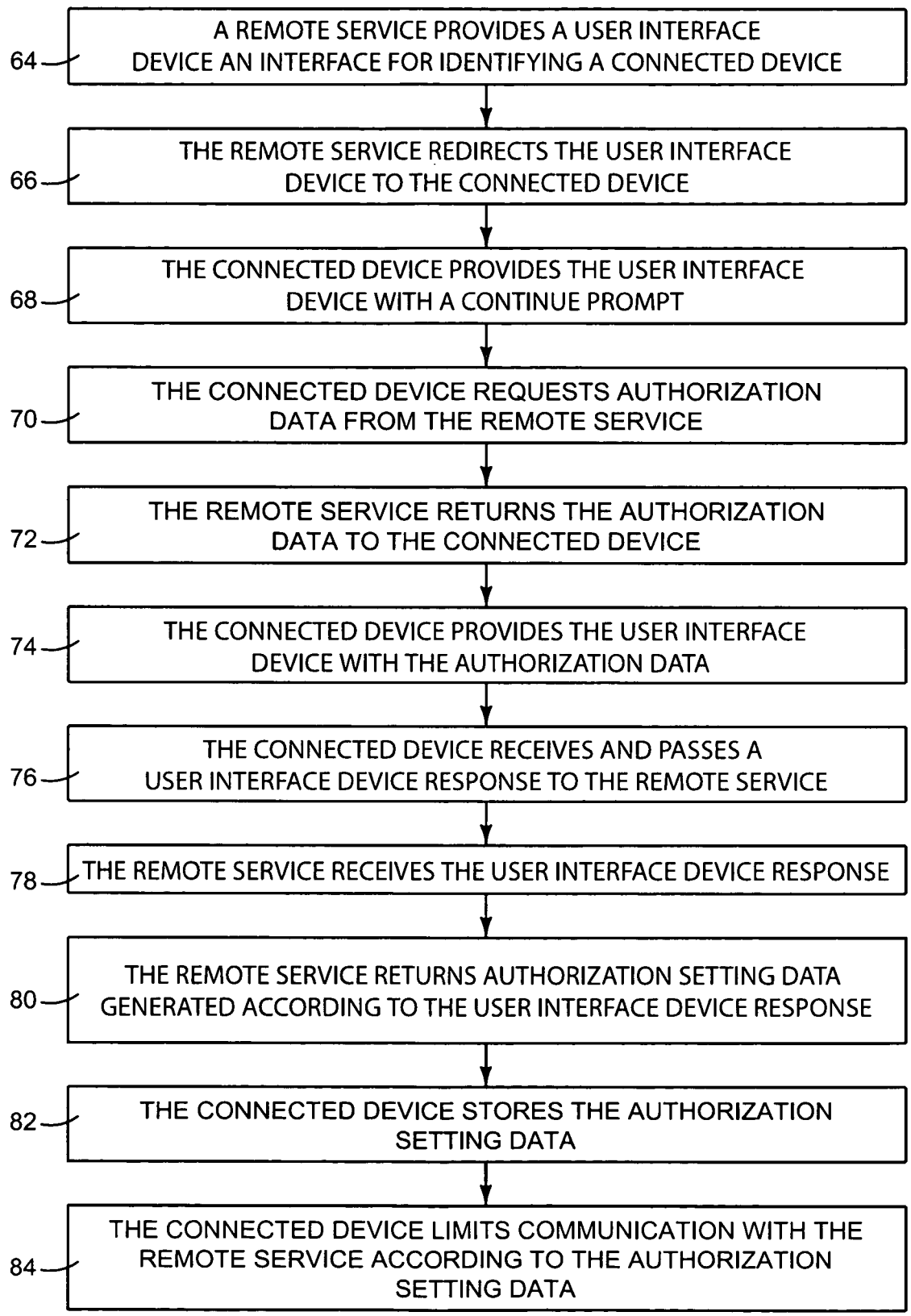

FIG. 5 is a flow diagram of exemplary acts taken from the perspective of a connected device and a remote service. The remote service provides a user interface device with an interface for identifying the connected device (step 64). That interface includes controls enabling a user of the user interface device to supply connected device access data. That interface may also include controls enabling the user to supply user information such as a username and password.

After receiving the connected device access data, the remote service redirects the user interface device to the connected device (step 66). Step 66, for example may involve sending the user interface device a redirection instruction that includes the connected device access data, an address for the connected device to use to access the remote service, and session data.

Redirected to the connected device, the user interface device and provides the connected device with the remote service access data for accessing the remote service and the session data. The connected device has knowledge that it is not authorized to access the remote service, so the connected device provides the client with an interface having a connection prompt (step 68). The connection prompt, for example, asks for the user's permission to allow the connected device to access the remote service to request authorization data.

Assuming permission is granted, the connected device requests authorization data from the remote service (step 70). The remote service returns authorization data to the connected device. That authorization data includes an authorization prompt and may include a human key prompt. The connected device passes the authorization data to the user interface device (step 72).

The connected device then provides the authorization data to the user interface device (step 74). The connected device receives and passes user interface device responses to the authorization and human key prompts to the remote service (step 76). The remote service receives the user interface device responses (step 78). Assuming the response to the human key prompt can be validated, the remote service returns authorization setting data to the connected device (step 80). The authorization setting data has a value determined according to the user interface device response to the authorization prompt. The connected device stores the authorization setting data (step 82). The connected device limits communication with the remote service according to the value of the stored authorization setting data (Step 84).

Figure 6:
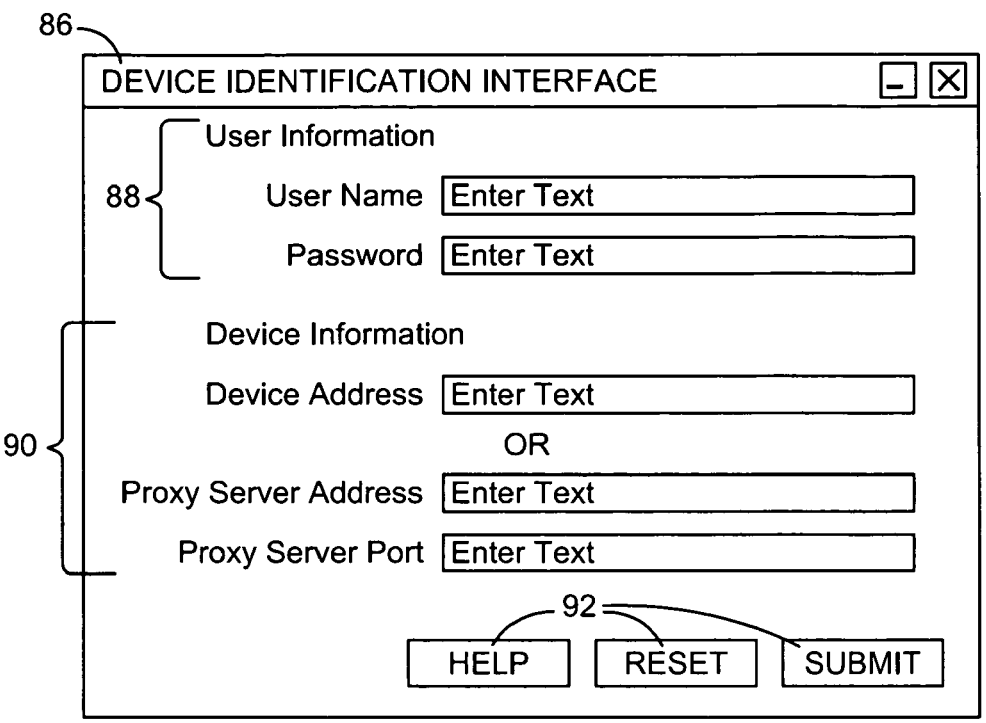
FIGS. 6-8 and 9A-9C are exemplary screen views of user interfaces displayed by a user interface device according to various embodiments.

FIGS. 6-8 and 9A-9C illustrate various exemplary screen displays presented to a user of a user interface device through the performance of the acts described with respect to FIG. 5. FIG. 6 illustrates a device identification interface 86 displayed by user interface device following step 64. Interface 86 includes user information section 88, device information section 90, and command buttons 92. User information section 90 includes text boxes for supplying connected device access data—in this case—a username and password. Device information section 90 includes text boxes for supplying an address for a connected device or an address and port number for a proxy server that the connected device can use to access the remote server. Command buttons 92 allow a user to request help, reset the text boxes, and submit data provided in the text boxes.

Figure 7:
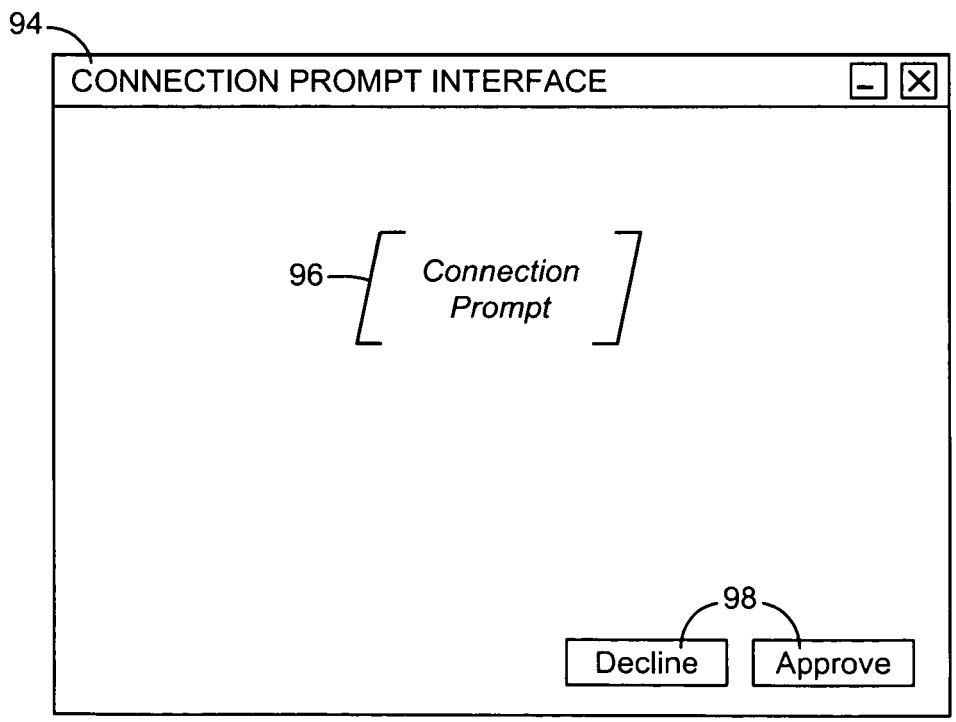

FIG. 7 illustrates a connection prompt interface 94 displayed by a user interface device following step 68 in FIG. 5. Interface 94 includes connection prompt information 96 and command buttons 98. Connection prompt information 96 represents textual information presented to a user requesting permission for the connected device to request authorization data from the remote service. Command buttons 98 allow a user to give or deny permission.

Figure 8:
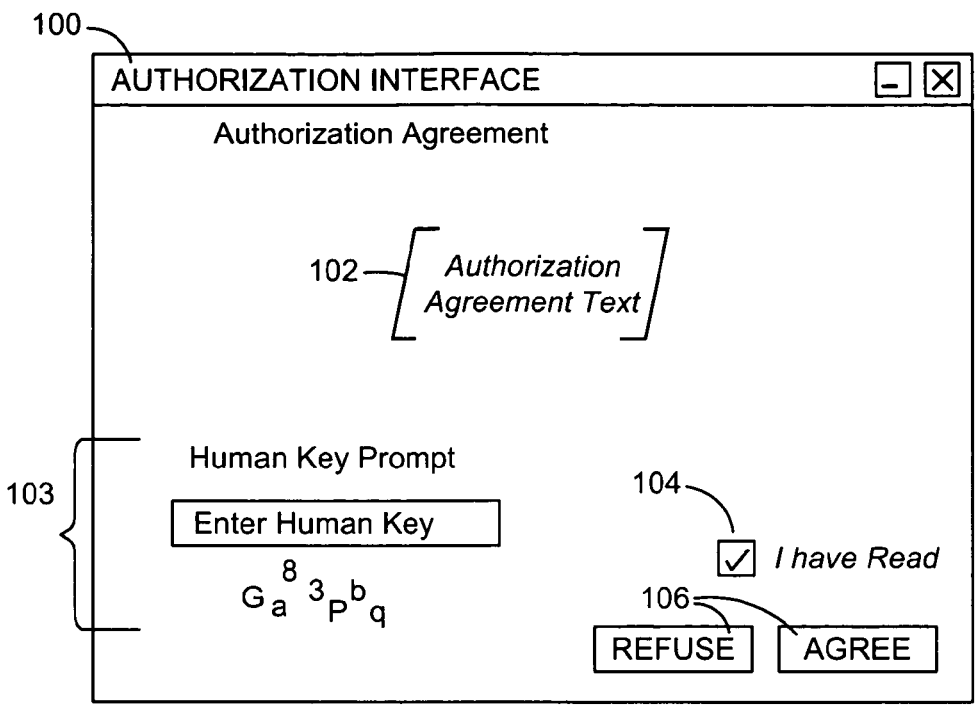

FIG. 8 illustrates a single screen authorization interface 100 displayed by a user interface device following step 74 in FIG. 5. Interface 100 includes authorization agreement text 102, human key prompt 103, authorization prompt 104, and command buttons 106. Authorization agreement text 102 represents the textual information authorization data intends to convey to a user of the user interface device. As previously described, that information can include the text of a privacy agreement and the text of a license agreement approval of which authorized the connected device to interact with the remote service. Human key prompt 103 includes a graphical image of an alpha numeric data string and a text box allowing a user to respond by manually entering that data string. Authorization prompt 104 includes a check box allowing a user to indicate that the user has read the authorization agreement text. Control buttons 106 allow a user to submit an indication of agreement or refusal with respect to the authorization agreement text.

Figure 9A:
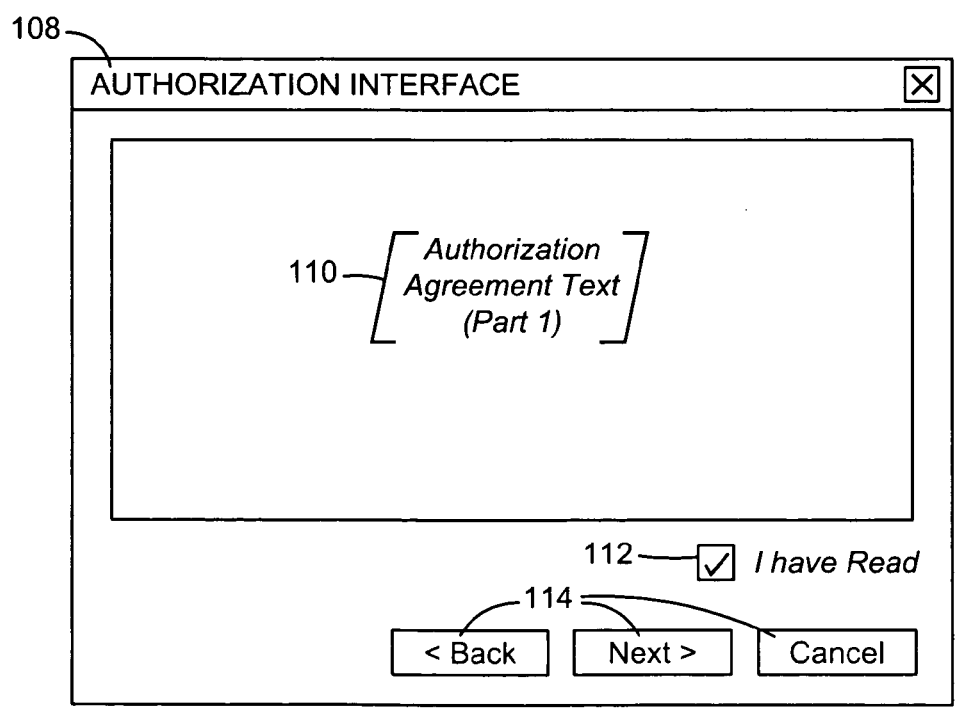
Figure 9B:
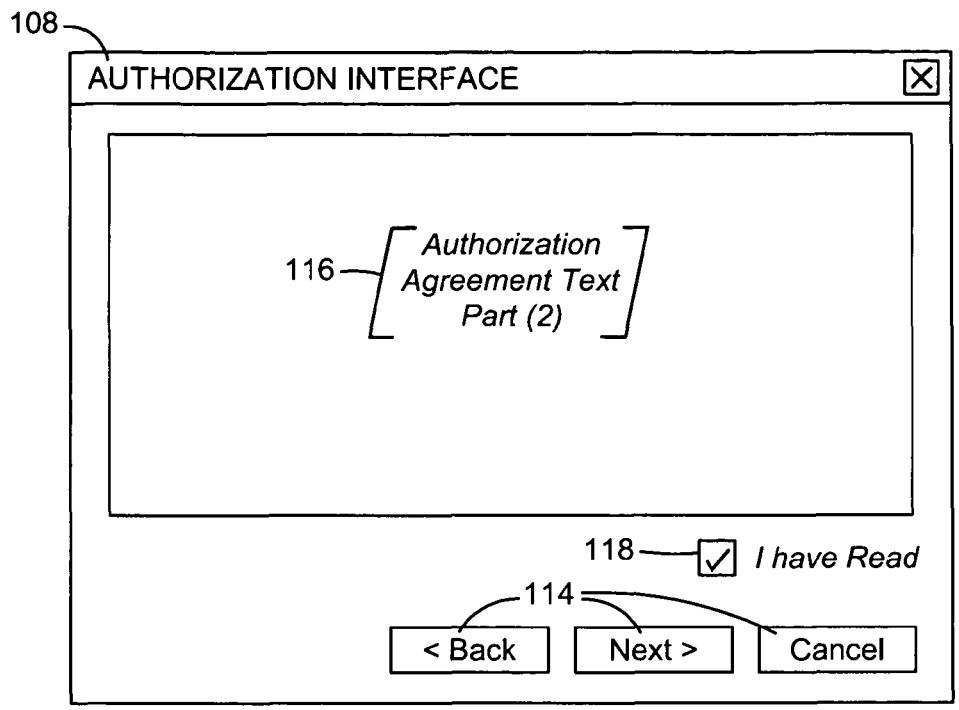
Figure 9C:
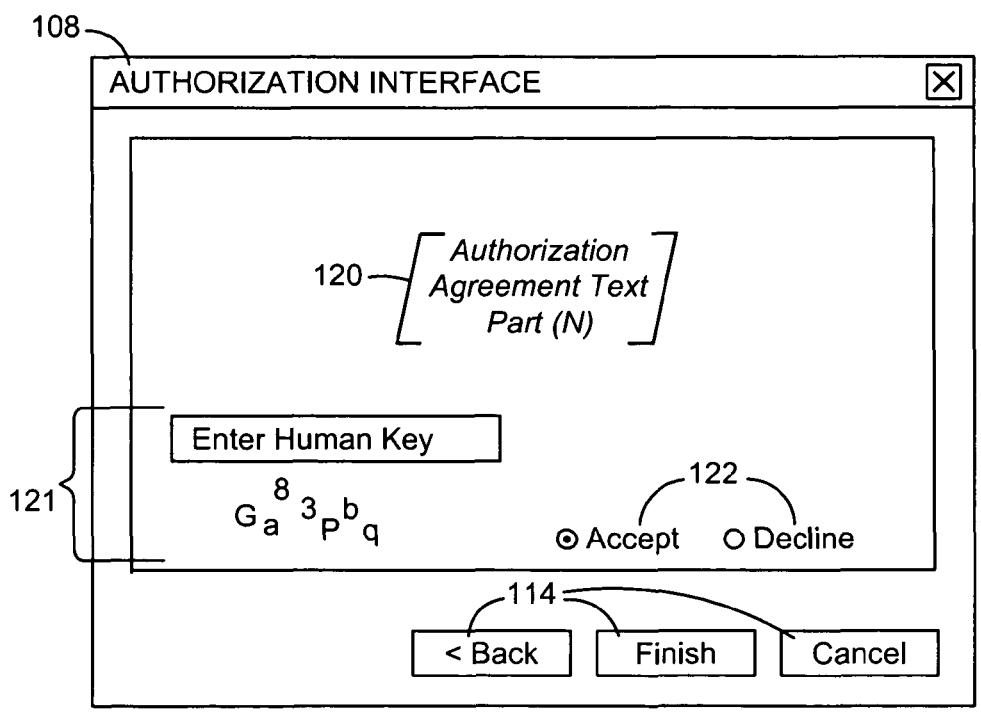

FIGS. 9A-9C illustrates a multi-screen authorization interface 108 displayed by a user interface device following step 74 in FIG. 5. Referring first to FIG. 9A, interface 108 includes a first screen with authorization agreement text 110, authorization prompt 112, and command buttons 114. Authorization agreement text 110 represents a first portion of the authorization data to be conveyed to a user of the user interface device. As previously described, that information can include the text of a privacy agreement and the text of a license agreement approval of which authorized the connected device to interact with the remote service. Authorization prompt 112 includes a check box allowing a user to indicate that the user has read and agrees to the authorization agreement text 110. Control buttons 106 allow a user to submit an indication of an intent to move on to a second screen.

Referring to FIG. 9B, interface 108 includes the second screen with authorization agreement text 116, authorization prompt 118, and command buttons 114. Authorization agreement text 116 represents a second portion of the authorization data to be conveyed to a user of the user interface device. Authorization prompt 118 includes a check box allowing a user to indicate that the user has read and agrees to the authorization agreement text 116. Control buttons 114 allow a user to submit an indication of an intent to move on to a third screen or back to the first screen of FIG. 9A.

Referring to FIG. 9C, interface 108 includes third and final screen with authorization agreement text 120, human key prompt 121, authorization prompt 122, and command buttons 114. Authorization agreement text 120 represents a final portion of the authorization data to be conveyed to a user of the user interface device. Authorization prompt 122 includes a check box allowing a user to indicate that the user has read and agrees to the authorization agreement text 122. Control buttons 114 allow a user to submit an indication of an intent to move back to the second screen of FIG. 9B, to cancel, or to submit authorization prompt responses on to the connected device.

CONCLUSION

The network 10 of FIG. 1 illustrates an exemplary environment in which embodiments may be implemented. Implementation, however, is not limited to network 10. The block diagram of FIG. 2 shows the architecture, functionality, and operation of various embodiments of the present invention. A number of the blocks are defined at least in part as programs. Each of those blocks may represent in whole or in part a module, segment, or portion of code that comprises one or more executable instructions to implement the specified logical function(s). Each block may also represent a circuit or a number of interconnected circuits to implement the specified logical function(s).

Also, the present invention can be embodied at least in part, in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, infrared, or semiconductor media. More specific examples of suitable computer-readable media include, but are not limited to, a portable magnetic computer diskette such as floppy diskettes, hard drives or a portable compact disc.

Although the flow diagrams of FIGS. 3-5 show specific orders of execution, the orders of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

The exemplary screen displays of interfaces presented by a user interface device in FIGS. 6-8 and 9A-9C are just that—exemplary. There are a multitude or other interface configurations that will serve the same or similar purposes.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A method for authorizing device interaction, comprising:
   at a connected device, requesting authorization data from a remote service;
   at the connected device, receiving and passing the authorization data with an authorization prompt to a user interface device distinct from the connected device and configured to communicate directly with the remote service independent of the connected device;
   from the connected device, passing a user interface device response to the prompt to the remote service; and
   at the connected device, receiving from the remote service and storing authorization setting data having a value determined using the user interface device response, the authorization setting data subsequently useable by the connected device during a different interaction session without being retrieved from the remote service to determine authorization for subsequent connected device interaction with the remote service during the different interaction session.

2. The method of claim 1:
   further comprising, receiving an access request from the user interface device, the access request including remote service access data, and
   wherein requesting comprises, from the connected device, accessing the remote service using the remote service access data to request the authorization data.

3. The method of claim 2, wherein the access request from the user interface device resulted from a redirection instruction sent from the remote service to the user interface device, the redirection instruction including the remote service access data and session data for identifying a relationship between the user interface device and the remote service, and wherein requesting comprises, from the connected device, accessing the remote service using the remote service access data to request the authorization data, the request including the session data.

4. The method of claim 1, further comprising, limiting connected device interaction with the remote service, at least partly, according to the authorization setting data.

5. The method of claim 1, further comprising:
   receiving, at the remote service, access data for a connected device, wherein the remote service is a service device remotely located and distinct from the user interface device;

from the remote service, redirecting the user interface device to the connected device using the access data;
at the remote service, receiving the request for authorization data from the connected device;
returning, from the remote service, the authorization data to the connected device;
at the remote service, receiving the user interface device response from the connected device; and
from the remote service, returning the authorization setting data to the connected device.

6. The method of claim 5, wherein:
redirecting includes sending the user interface device a redirection instruction that includes remote service access data for use by the connected device to access the remote service and session data identifying a relationship between the user interface device and the remote service;
receiving the request for authorization data includes, at the remote service, receiving the request for authorization data from the connected device, the request including the session data; and
returning the authorization data includes returning, from the remote service, authorization data customized, at least partly, according to the session data.

7. The method of claim 1, wherein the connected device comprises a printer having network communication.

8. The method of claim 1, wherein the authorization setting data is selected from a group of data consisting of: an authorization flag and a password credential.

9. The method of claim 1, wherein the authorization data from the remote service comprises one or more agreements and wherein the authorization prompt comprises one or more user accessible controls for indicating exceptions or denial with respect to the one of more agreements.

10. The method of claim 1, further comprising, at the connected device, limiting communication with the remote service to different time periods for which authorization is effective based upon the value of the authorization setting data.

11. The method of claim 1, wherein the user interface device communicates with the connected device across a network.

12. The method of claim 1, wherein the user interface device is selected from a group consisting of a personal computer, a personal digital assistant and a smart phone and wherein the connected device comprises a printer.

13. The method of claim 1, wherein authorization setting data is usable by the connected device to communicate with the remote service in the different interaction session without communication between the connected device and the user interface device.

14. The method of claim 1, wherein the connected device has a first network address and wherein the user interface device has a second network address different than the first network address.

15. The method of claim 1, wherein the connected device has a display screen distinct from the user interface device.

16. The method of claim 1, wherein the connected device and the user interface device communicate across a link comprising an intranet, the Internet or a combination of both.

17. The method of claim 1, wherein the remote service is a service device distinct from and remotely located from the user interface device.

18. A computer readable medium having computer executable instructions for:
causing a connected device to request authorization data from a remote service;
at the connected device, receiving and passing the authorization data with an authorization prompt to a user interface device distinct from the connected device and configured to communicate directly with the remote service independent of the connected device;
from the connected device, passing a user interface device response to the prompt to the remote service; and
at the connected device, receiving and storing authorization setting data having a value determined using the user interface device response, the authorization setting data subsequently useable by the connected device during a different interaction session without being retrieved from the remote service to determine authorization for subsequent connected device interaction with the remote service during the different interaction session.

19. The medium of claim 18:
having further instructions for receiving an access request from the user interface device, the access request including remote service access data, and
wherein the instructions for requesting includes instructions for, from the connected device, accessing the remote service using the remote service access data to request the authorization data.

20. The medium of claim 19, wherein the access request resulted from a redirection instruction sent from the remote service to the user interface device, the redirection instruction including the remote service access data and session data for identifying a relationship between the user interface device and the remote service, and wherein the instructions for requesting include instructions for, from the connected device, accessing the remote service using the remote service access data to request the authorization data, the request including the session data.

21. The medium of claim 18, having further instructions for limiting connected device interaction with the remote service, at least partly, according to the stored authorization setting data.

22. The medium of claim 18, having further instructions for:
receiving, at the remote service, connected device access data;
from the remote service, redirecting the user interface device to the connected device using the connected device access data;
at the remote service, receiving a request for the authorization data from the connected device;
returning, from the remote service, the authorization data to the connected device;
at the remote service, receiving the user interface device response from the connected device; and
from the remote service, returning authorization setting data to the connected device.

23. The medium of claim 22, wherein the instructions for:
redirecting include instructions for sending the user interface device a redirection instruction that includes remote service access data for use by the connected device to access the remote service and session data identifying a relationship between the user interface device and the remote service;
receiving the request for authorization data include instructions for, at the remote service, receiving a request for the authorization data from the connected device, the request including the session data; and
returning the authorization data include instructions for returning, from the remote service, authorization data customized, at least partly, according to the session data.

24. A connected device implemented system for authorizing device interaction, comprising;
- device communication logic operable to request and receive authorization data from a remote service, the authorization data including an authorization prompt, to pass the authorization data to a user interface device distinct from the connected device and configured to communicate directly with the remote service independent of the connected device, to pass a user interface device response to the authorization prompt to the remote service, and to receive authorization setting data having a value determined using the user interface device response; and
- authorization logic operable to store and subsequently utilize the authorization setting data during a different interaction session without being retrieved from the remote service to determine authorization for subsequent connected device interaction with the remote service during the different interaction session.

25. The system of claim 24, wherein:
the device communication logic is operable to receive an access request from the user interface device, the access request including remote service access data, and to access the remote service using the remote service access data to request the authorization data.

26. The system of claim 25, wherein the access request from the user interface device resulted from a redirection instruction sent from the remote service to the user interface device, the redirection instruction including the remote service access data and session data for identifying a relationship between the user interface device and the remote service, and wherein the device communication logic is operable to access the remote service using the remote service access data to request the authorization data, the request including the session data.

27. The system of claim 24, wherein the device authorization logic is operable to limit device interaction with the remote service, at least partly, according to the authorization setting data.

28. The system of claim 24, further comprising remote communication logic and remote authorization logic, wherein:
- the remote communication logic is operable to receive the connected device access data from a user interface device, send an instruction to redirect the user interface device to the connected device using the connected device access data, receive a request for the authorization data from the connected device, return the authorization data to the connected device, receive the user interface device response from the connected device, and return the authorization setting data to the connected device; and
- the remote authorization logic operable to determine a value for the authorization setting data according to the user interface device response.

29. The system of claim 28, wherein the remote communication logic is operable to send the user interface device a redirection instruction that includes remote service access data for use by the connected device to access the remote service.

30. The system of claim 29, wherein:
the remote communication logic is operable to send the user interface device a redirection instruction that includes remote service access data for use by the connected device to access the remote service and session data identifying a relationship between the user interface device and the remote service and to receive a request for authorization data from the connected device, the request including the session data; and
the remote authorization logic is operable to cause the remote communication logic to return authorization data customized, at least partly, according to the session data.

31. The system of claim 28:
wherein the remote authorization logic is operable to cause the remote communication logic to return authorization data to the connected device that includes a human key prompt;
wherein the remote communication logic is operable to receive a user interface device response from the connected device, the response including a response to the authorization prompt and a human key entered at the user interface device in response to the human key prompt; and
the remote authorization logic is operable to verify the human key before the remote communication logic returns the authorization setting data to the connected device.

32. A method for authorizing device interaction, comprising:
at a connected device, requesting authorization data from a remote service;
at the connected device, receiving and passing the authorization data with an authorization prompt to a user interface device;
from the connected device, passing a user interface device response to the prompt to the remote service;
at the connected device, receiving from the remote service and storing authorization setting data having a value determined using the user interface device response, the authorization setting data subsequently useable by the connected device during a different interaction session without being retrieved from the remote service to determine authorization for subsequent connected device interaction with the remote service during the different interaction session;
receiving, at the remote service, access data for a connected device;
from the remote service, redirecting the user interface device to the connected device using the access data, wherein the remote service is a service device remotely located and distinct from the user interface device;
at the remote service, receiving the request for authorization data from the connected device;
returning, from the remote service, the authorization data to the connected device;
at the remote service, receiving the user interface device response from the connected device; and
from the remote service, returning the authorization setting data to the connected device.

* * * * *